A. W. MINNEY.
OIL GUIDE AND DUST PROTECTOR.
APPLICATION FILED NOV. 15, 1920.
1,405,313.
Patented Jan. 31, 1922.
3 SHEETS—SHEET 3.
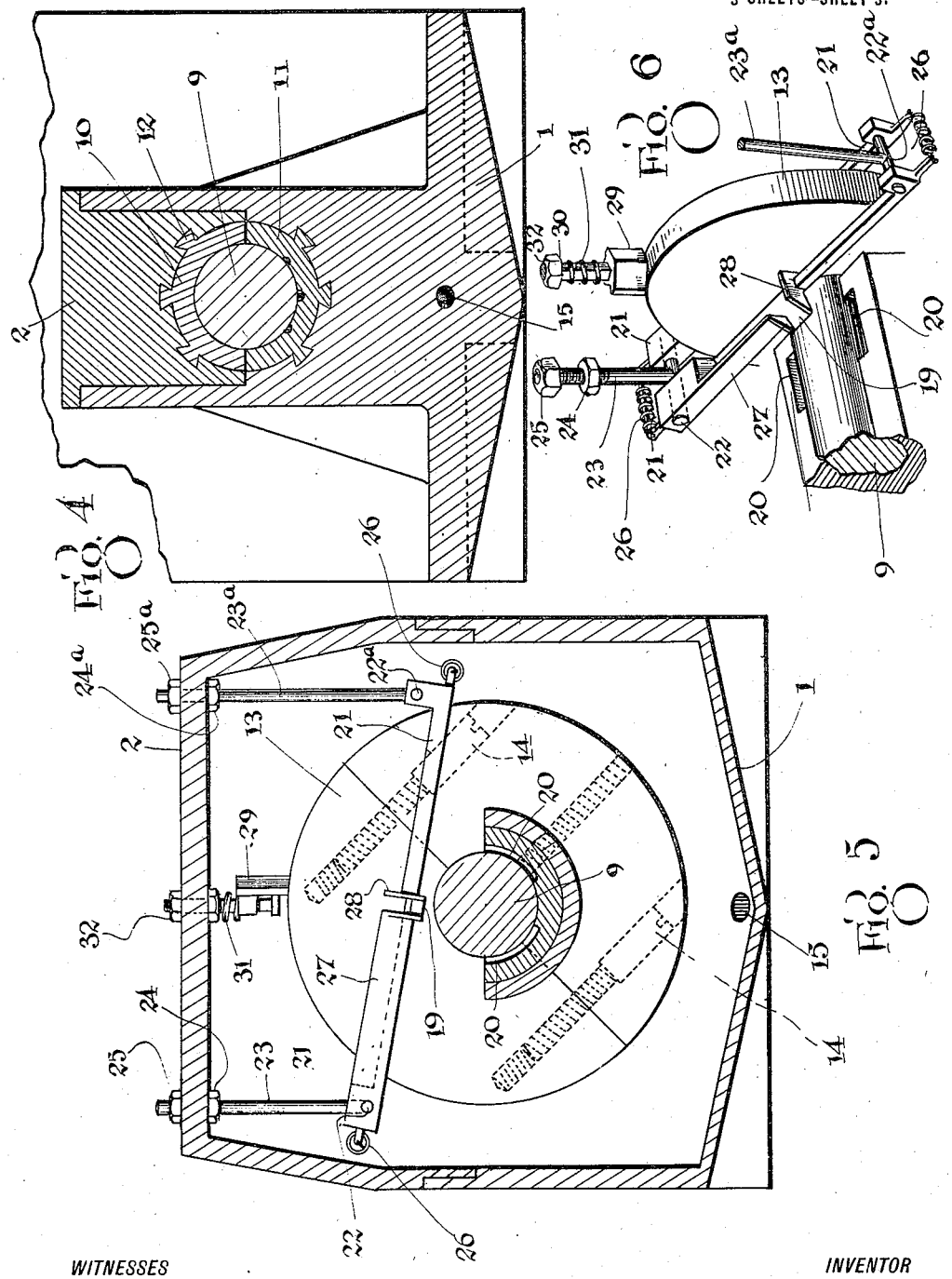
WITNESSES
INVENTOR
Arthur W. Minney.
BY
ATTORNEYS

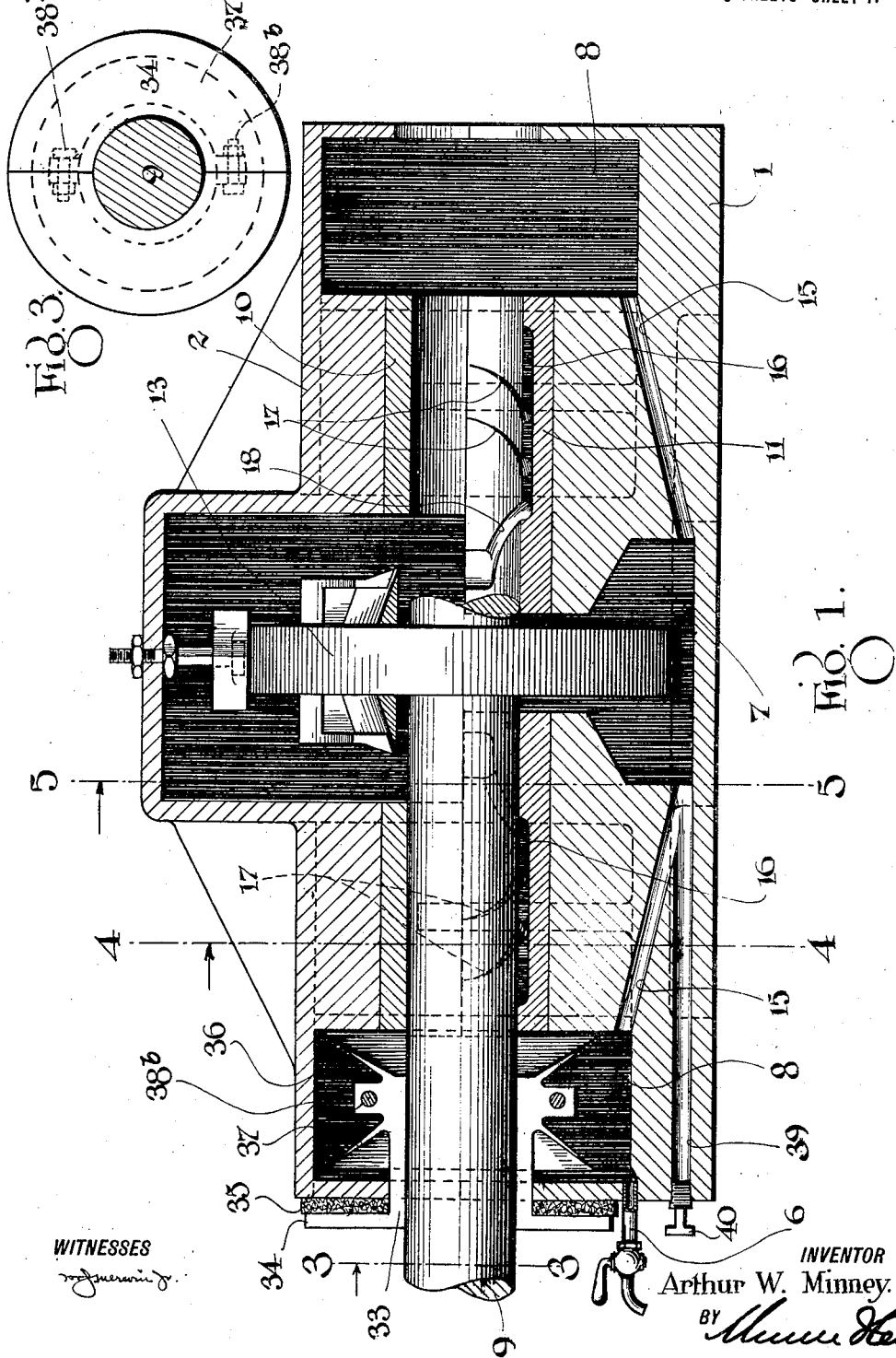

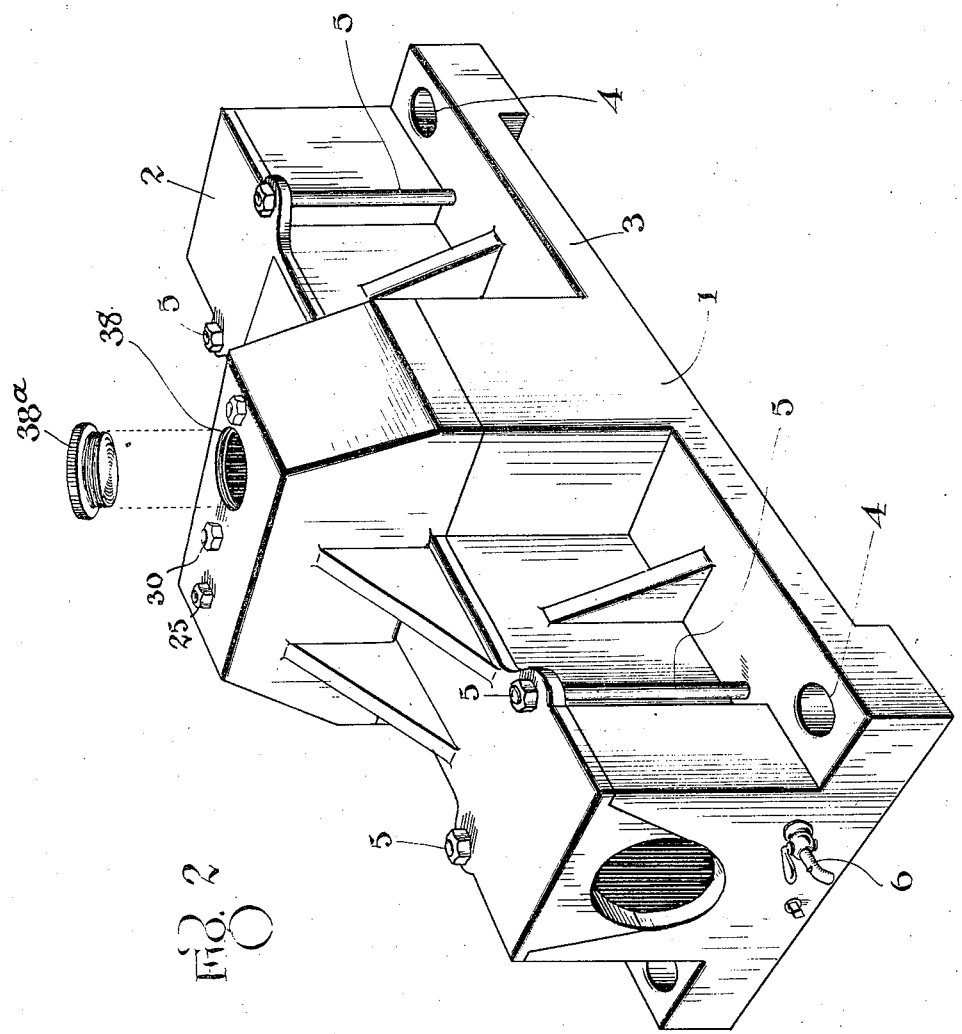

UNITED STATES PATENT OFFICE.

ARTHUR WELLS MINNEY, OF STOCKTON, CALIFORNIA.

OIL GUIDE AND DUST PROTECTOR.

1,405,313.  Specification of Letters Patent.  Patented Jan. 31, 1922.

Application filed November 15, 1920. Serial No. 424,168.

*To all whom it may concern:*

Be it known that I, ARTHUR W. MINNEY, a citizen of the United States, and a resident of Stockton, in the county of San Joaquin and State of California, have invented certain new and useful Improvements in Oil Guides and Dust Protectors, of which the following is a specification.

My invention is an improvement in oil guides and dust protectors for bearings, and has for its object to provide a bearing which may be packed with lubricant to provide continuous lubrication, and which is so arranged that the oil cannot escape from the bearing.

In the drawings:

Figure 1 is a longitudinal section through the improved bearing.

Figure 2 is a perspective view of the casing or box.

Figures 3, 4, and 5 are sections on the lines 3—3, 4—4, and 5—5 respectively of Figure 1.

Figure 6 is a perspective view of the distributing wheel.

In the present embodiment of the invention a box or casing is provided, consisting of a body 1, and a cover 2, the body having extended flanges 3 at its bottom which are provided with openings 4 for receiving screws or bolts to connect the box to a fixed support. The cover 2 is connected to the body by means of bolts and nuts 5. These bolts are passed through the flanges and through lateral ears on the cover and are engaged by the nuts above the cover. The body of the box has a drain valve 6 at one end, for permitting the box to be drained.

Referring to Figure 1, it will be seen that the body has three chambers, a central chamber 7, and lateral or end chambers 8. The shaft 9 is journaled in the box, and a sectional bushing 10—11 being arranged between the box and the shaft, and referring to Figure 4, it will be seen that the sections of the bushing have external longitudinally extending under cut ribs 12 which engage similar shaped grooves in the body and in the top or cover, to hold the bushing sections in place.

Referring to Figure 1, it will be seen that the chambers 7 and 8 are formed by recesses in the body and the cover, and a distributing wheel 13 is secured to the shaft in the central recess 7, the wheel consisting of two similar sections as shown in Figure 5, which are connected by screws 14, the heads of the screws being countersunk as shown. The central recess 7 extends to near the bottom of the body, and inclined passages 15 lead from the lateral chamber 8 to the central chamber, the said passages extending downwardly and inwardly. Thus the lubricant may flow from the lateral chambers and the central chamber, and means is provided for permitting the lubricant to flow around the shaft from the central chamber to the lateral chambers. The said means is in the form of grooves or passages 16 in the lower section 11 of the bushing and inclined grooves 17 lead upwardly and outwardly from the grooves 16. The grooves 17 are of greatest width and depth at their junction with the grooves 16, and gradually decrease in width and depth outwardly. Other grooves 18 lead upwardly and inwardly from the inner ends of the passages 16. The passages 16, 17 and 18 permit the lubricant to pass from the central chamber, in contact with the shaft and the bushing outwardly to the lateral chambers, thoroughly lubricating the shaft and bushing during its passage. The lubricant passes from the lateral chambers to the central chamber by way of the passages 15, and by the distributing wheel it is thrown upward, and again passes outward.

A pair of bars 21 is provided in connection with the distributing wheel, the said bars being pivoted at their rear ends on a cross head 22 at the lower end of a holding bolt or stem 23. A second bolt $23^a$ supports the forward ends of the bars 21, and the bolt $23^a$ having a cross head $22^a$ which engages openings in the forward ends of the bars. The bolts 23 and $23^a$ pass upwardly through the body of the cover 2, and each is provided with a stop 24 and $24^a$ respectively, below the cover, and nut 25 and $25^a$ respectively above the cover. Thus the bolts are held in place, and they support the bars. The bars are connected at each end by coil springs 26, the said springs acting to draw the bars toward the wheel, and the inner edge of each bar above and in rear of the shaft 9 is a scraper, moving in contact with the adjacent face of the wheel.

Referring to Figures 5 and 6, it will be seen that each bar has its upper face boxed in from directly above the shaft 9 to the rear of the wheel, by means of upstanding flanges 27 and 28, the flange 27 being at the side of the bar, and the boxed in space has an outlet indicated at 19 which is directly above the shaft, the said outlets delivering laterally. The bushing 11 is recessed on each side of the shaft as indicated at 20, at each outlet 19, and the lubricant flowing onto the shaft from the outlets may pass down into the recesses which conduct to the grooves 16 and 17.

A scraper is also provided at the top of the wheel 13. This scraper is in the form of a block 29 whose front face is beveled in opposite directions the peak or apex of the block being at the central plane of the wheel, and the block moves in contact with the periphery of the wheel. This block is supported on the lower end of a rod 30 which is mounted to extend through the body or cover 2, being normally pressed downward by a spring 31, which encircles the rod between the block and the top or cover, and a washer on the rod above the spring. A nut 32 is threaded on to the rod at its outer end, and as the wheel rotates the lubricant on the peripheral surface thereof will be scraped away and will be deflected in either direction.

In each chamber 8 there is provided a dust protector and oil guide. Each of these protectors is in the form of a bushing 33 which fits upon the shaft and extends through the adjacent end of the casing. Each bushing has a marginal flange 34 at its outer end, which holds a washer 35 of suitable absorbent material, as for instance felt or the like, against the end of the casing. At its inner end the bushing carries a tubular central shield consisting of an inwardly facing portion 36 and an outwardly facing portion 37. The bushing is sectional as shown in Figures 1 and 3, the sections being similar, and being secured on the shaft by means of bolts 38ᵇ. The shield 36 faces the ends of the bushings 10—11 while the shield 37 faces outwardly. Thus the shield 36 deflects the oil inwardly, while the shield 37 deflects dust outwardly. The washer 35 prevents the waste of oil and also prevents the entrance of dust to the lateral chamber. In order to permit lubricant to be introduced, the central chamber has a filling opening 38 in its top, which is closed by a threaded plug 38ᵃ. The drain valve 6 is at the bottom of a lateral chamber 8, and a passage 39 leads outwardly from the bottom of the central chamber 7, in order to permit this chamber to be drained. The outer end of the passage 39 is closed by a plug 40.

The improved device is adapted for use in any connection where it is desired to lubricate a bearing continually without the necessity for supervision, and to prevent the entrance of dust and the like to the bearing, as for instance, in flouring mills, saw mills and the like.

I claim:

1. A device of the character specified, comprising a bearing consisting of upper and lower sections and a shaft in the bearing between the sections, said bearing having a central and lateral chambers for lubricant through which the shaft extends, a distributing wheel for the lubricant secured to the shaft within the central chamber, said bearing having guide grooves at the shaft for directing the lubricant from the central chamber to the lateral chambers and having below the shaft passages for conducting the lubricant from the lateral to the central chamber, and means in each of the lateral chambers for deflecting the lubricant inwardly toward the passages.

2. A device of the character specified, comprising a bearing consisting of upper and lower sections and a shaft in the bearing between the sections, said bearing having a central and lateral chambers for lubricant through which the shaft extends, a distributing wheel for the lubricant secured to the shaft within the central chamber, said bearing having guide grooves at the shaft for directing the lubricant from the central chamber to the lateral chambers and having below the shaft passages for conducting the lubricant from the lateral to the central chamber, cone shape members secured to the shaft within the lateral chambers and having their large ends inwardly.

3. A device of the character specified, comprising a bearing consisting of upper and lower sections and a shaft in the bearing between the sections, said bearing having a central and lateral chambers for lubricant through which the shaft extends, a distributing wheel for the lubricant secured to the shaft within the central chamber, said bearing having guide grooves at the shaft for directing the lubricant from the central chamber to the lateral chambers and having below the shaft passages for conducting the lubricant from the lateral to the central chamber, a bushing on the shaft at each end of the bearing and carrying oppositely arranged deflectors within the adjacent lateral chamber, said deflectors being cone shaped and facing inwardly and outwardly, collars secured to the shaft at the end of the bearing and having facing or felt for engaging the ends of the bearing.

ARTHUR WELLS MINNEY.